United States Patent [19]

Miyazawa

[11] Patent Number: 4,641,042
[45] Date of Patent: Feb. 3, 1987

[54] POWER SUPPLY SYSTEM AND A CONTROL METHOD THEREOF

[75] Inventor: Yoshiaki Miyazawa, Tokyo, Japan

[73] Assignee: Kabushiki Kaisha Toshiba, Kawasaki, Japan

[21] Appl. No.: 735,738

[22] Filed: May 20, 1985

[30] Foreign Application Priority Data

May 25, 1984 [JP] Japan .................. 59-104688

[51] Int. Cl.$^4$ .................... H02J 3/06; H02J 9/06
[52] U.S. Cl. .................... 307/66; 307/43; 307/65; 307/87; 363/34
[58] Field of Search .......... 363/34, 37; 307/43, 307/44, 45, 46, 52, 64, 65, 66, 85, 86, 87

[56] References Cited

U.S. PATENT DOCUMENTS

| 3,609,506 | 9/1971 | Frezzolini | 307/66 X |
| 4,246,633 | 1/1981 | Borkovitz | 307/66 X |
| 4,516,035 | 5/1985 | Rhoads et al. | 307/87 X |
| 4,517,634 | 5/1985 | Sakai | 363/37 X |
| 4,528,457 | 7/1985 | Keefe et al. | 307/87 X |

FOREIGN PATENT DOCUMENTS 0493858 2/1976 U.S.S.R. .................. 307/64

Primary Examiner—William M. Shoop, Jr.
Assistant Examiner—Bentsu Ro
Attorney, Agent, or Firm—Cushman, Darby & Cushman

[57] ABSTRACT

A power supply system including an inverter, a reserved power source and changeover switches for outputting one of outputs of the inverter and reserved power source to supply a load current to a load. The system further includes a control circuit for controlling a phase, a frequency and a voltage of the output of the inverter to coincide with a phase, a frequency of the output of the reserved power source and a specified voltage, respectively. The specified voltage is determined to be a predetermined reference voltage when the load current is below a detection level and to be a reduction voltage decided between zero volt and the voltage of the reserved power source when the load current is equal to or more than the detection level. A method for controlling a power supply system described above is also disclosed.

17 Claims, 5 Drawing Figures

POWER SUPPLY SYSTEM AND A CONTROL METHOD THEREOF

BACKGROUND OF THE INVENTION

1. Field of the Invention

This invention relates in general to power supply systems. Specifically, the invention provides a power supply system which instantaneously switches an inverter to another reserved power source so as to supply power to a load without any interruption. This invention also provides a method for controlling a power supply system.

2. Description of the Prior Art

Hitherto there has been widely used a power supply system provided with changeover switches to switch a load from an output of an inverter to a stand-by commercial power source (a reserved power source). In normal operation, the inverter's output supplies power to the load through the changeover switches. If the inverter fails or must be shut down for maintenance, the system causes the changeover switches to switch the load from the inverter's output to the stand-by commercial power source so as to directly supply power to the load. When the inverter is again operational, the system causes the changeover switches to switch the load back to the inverter's output so as to continuously supply power to the load. As an example of such a conventional power supply system, "Uninterruptible Power Supplies with Inverters" are described in the Siemens Review XL (1973) No. 8, pages 365-368.

In the above-described conventional power supply system, should a load current exceed the current capacity of the inverter when the inverter is supplying power to the load, the inverter is tripped by the output of a protective device provided in the power supply system. At the same time the changeover switches are caused, as in the above-described case of inverter failure, to switch the inverter to the stand-by commercial power source which then provides power to the load. The conventional power supply system, described above, has some operational difficulties and disadvantages.

The inverter usually trips upon start-up operation of a load such as a motor or a transformer through which an excessive current flows at its start-up operation. Thus, at every start-up of the load, the inverter trips and must be restarted so that the load can then be switched back to the inverter.

In the conventional power supply system, a current limiting operation may be employed. With current limiting, there is a rapid reduction of output voltage of the inverter and tripping is avoided. However, with current limiting operation, the load "sees" an instantaneous interruption of power. In addition, in the case of a short-circuit failure on the load side, it is difficult for the inverter to supply a sufficient short-circuit current so as to perform a selective interruption. As a result, it is difficult to distinguish a short-circuited feeder from a normal feeder.

One proposal to address the above-described problems was to make the changeover switch a semiconductor interrupter provided with a forced commutation circuit in the power supply system. However, such a power supply system is expensive to manufacture because a semiconductor interrupter is an expensive component. Furthermore, the reliability of such a system becomes low because of the increased number of components required in such a power supply system.

SUMMARY OF THE INVENTION

Accordingly, one object of this invention is to provide a power supply system which switches a load from an inverter output to a reserved power source so as to supply a sufficient overcurrent to a load without an instantaneous interruption and without tripping the inverter in case of overload current condition.

Another object of this invention is to provide a method for controlling a power supply system provided with an inverter and changeover switches which can supply a sufficient overcurrent to a load without any instantaneous interruption and without tripping the inverter in case of overload condition.

These and other objects of this invention are achieved by providing a power supply system including an inverter for converting a DC power into a first AC power, a reserved power source for generating a second AC power and changeover switches connected to receive the first AC power and the second AC power for outputting one of the first and second AC powers, the changeover switches being adapted to supply a load current to a load. The power supply system further includes a phase and frequency control circuit connected to receive the first AC power and the second AC power for producing a first control signal so as to control a phase and a frequency of the first AC power to coincide with a phase and a frequency of the second AC power, and an overcurrent detection circuit connected to detect the load current for comparing the load current with a detection level to produce an overcurrent detection signal with a first level indicating that the load current is less than the detection level and a second level indicating that the load current is equal to or more than the detection level. The power supply system further includes a voltage control circuit connected to receive a reference voltage, the first AC power, the second AC power and the overcurrent detection signal for producing a second control signal so as to control a voltage of the first AC power to be a specified voltage, the specified voltage being determined to be the reference voltage when the overcurrent detection signal is at the first level and to be a reduced voltage decided between zero voltage and the voltage of the second AC power when the overcurrent detection signal is at the second level. The power supply system further includes a control circuit connected to receive the first control signal and the second control signal for controlling the phase, the frequency and the voltage of the first AC power to coincide with the phase, the frequency of the second AC power and with the specified voltage determined by the second control signal, respectively, wherein the changeover switches are further connected to receive the overcurrent detection signal for outputting the first AC power when the overcurrent detection signal is at the first level and the second AC power when the overcurrent detection signal is at the second level.

According to this invention there is further provided a method for controlling a power supply system as described above, and including the steps of detecting whether or not the load current exceeds a detection level, and supplying the load current from the reserved power source and stopping supplying the load current from the inverter by controlling the changeover switches and reducing the voltage of the first AC power to a specified reduced voltage in case that the load current exceeds the detection level.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
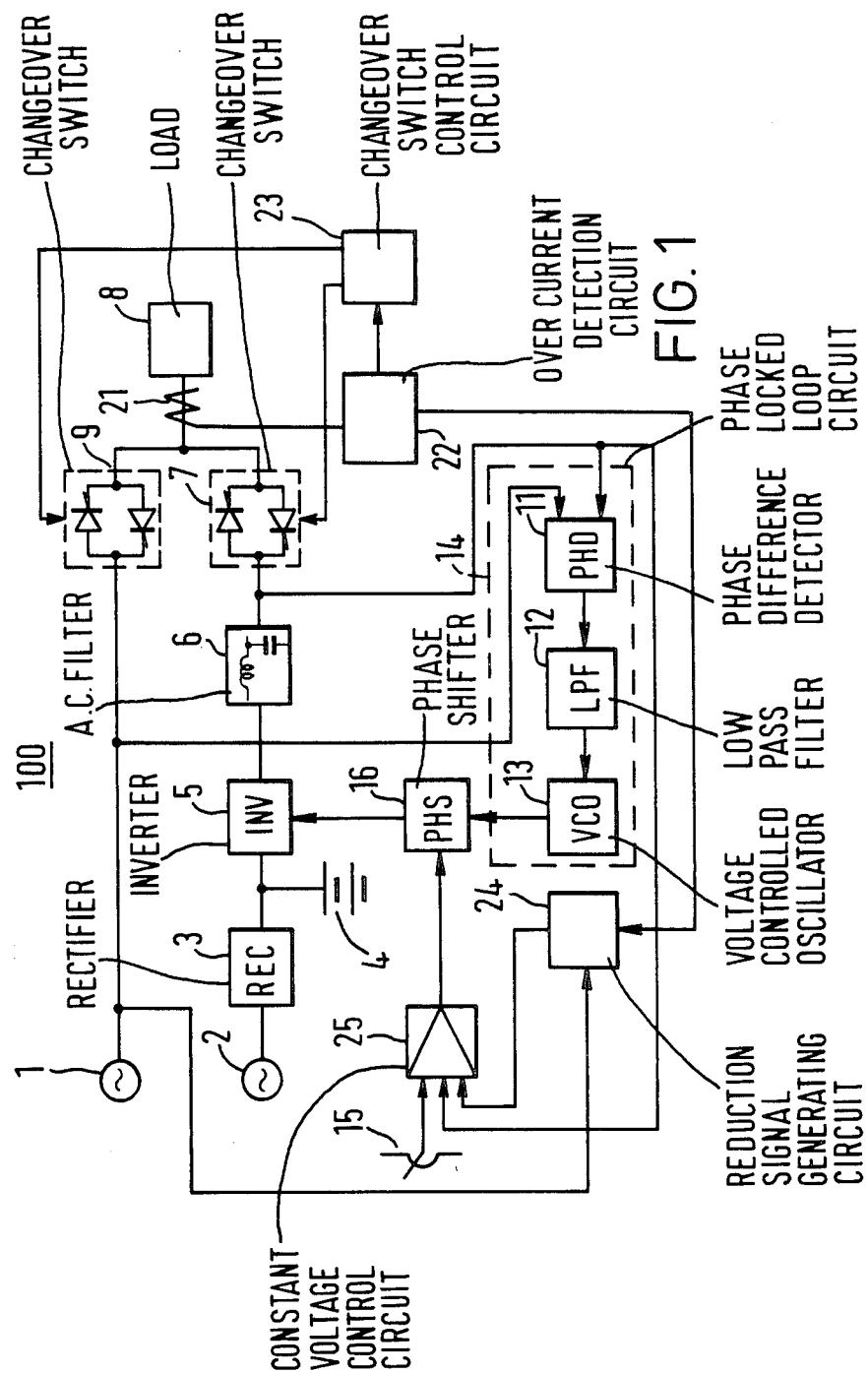
FIG. 1 is a block diagram illustrating an uninterruptible power supply according to a preferred embodiment of this invention.

Referring now to the drawings, wherein like reference numerals designate identical or corresponding parts throughout the several views, and more particularly to FIG. 1 thereof, reference numeral 100 designates an uninterruptible power supply according to a preferred embodiment of this invention. In FIG. 1, reference numeral 1 designates a stand-by commercial power source, 2 designates a commercial power source, 3 designates a rectifier and 4 designates a battery to be charged by the rectifier 3. Reference numeral 5 designates an inverter that converts a DC power supplied from the rectifier 3 or the battery 4 into an AC power and 6 designates an AC filter that changes a square wave output of inverter 5 into a sinusoidal wave output. Reference numerals 7 and 9 designate static type changeover switches such as, for example, semiconductor switches and 8 designates a load. Reference numeral 11 designates a phase difference detector that detects a phase difference between the phases of the outputs of the stand-by commercial power source 1 and the inverter 5. Reference numeral 12 designates a lower pass filter that passes only low-frequency components from the output of phase difference detector 11 to a voltage controlled oscillator (VCO) 13 for generating pulses, the frequency of which is controlled in response to the output of low pass filter 12. Phase difference detector 11, low pass filter 12 and VCO 13 together constitute a so-called phase locked loop circuit 14, which outputs pulses as a first control signal to control inverter 5 so as to cause the phase and the frequency of its output to coincide with those of stand-by commercial power source 1. Reference numeral 15 designates a voltage reference setting circuit and 16 designates a phase shifter. Reference numeral 21 designates a current transformer that detects a load current and 22 designates an overcurrent detection circuit for producing an overcurrent detection signal when the load current detected by the current transformer 21 exceeds a specified current detection level $I_o$ determined, based on the overload capacity of the inverter 5. Reference numeral 23 designates a changeover switch control circuit for controlling the changeover switches 7 and 9. Reference numeral 24 designates a reduction signal generating circuit that receives the output voltage of the stand-by commercial power source 1 and produces a reduced voltage to reduce the output voltage of the inverter 5 in accordance with a magnitude of the received output voltage of the stand-by commercial power source 1 when the overcurrent detection signal is applied from the overcurrent detection circuit 22 and output the reduced voltage as a reduction signal. Reference numeral 25 designates a constant voltage control circuit that receives a reference voltage set by the voltage reference setting circuit 15, an output voltage of the inverter 5 through the AC filter 6 and the reduction signal from the reduction signal generating circuit 24, and generates a second control signal so as to cause the output voltage of the inverter 5 to be a specified voltage decided by the constant voltage control circuit 25. The phase shifter 16 receives the pulses from VCO 13 and the second control signal from the constant voltage control circuit 25 and controls the firing phase of switching elements in the inverter 5 in response to the second control signal of the constant voltage control circuit 25 by using the pulses of VCO 13 as a frequency reference, thereby to control the frequency, the phase and the magnitude of the output voltage of inverter 5.

Figure 2:
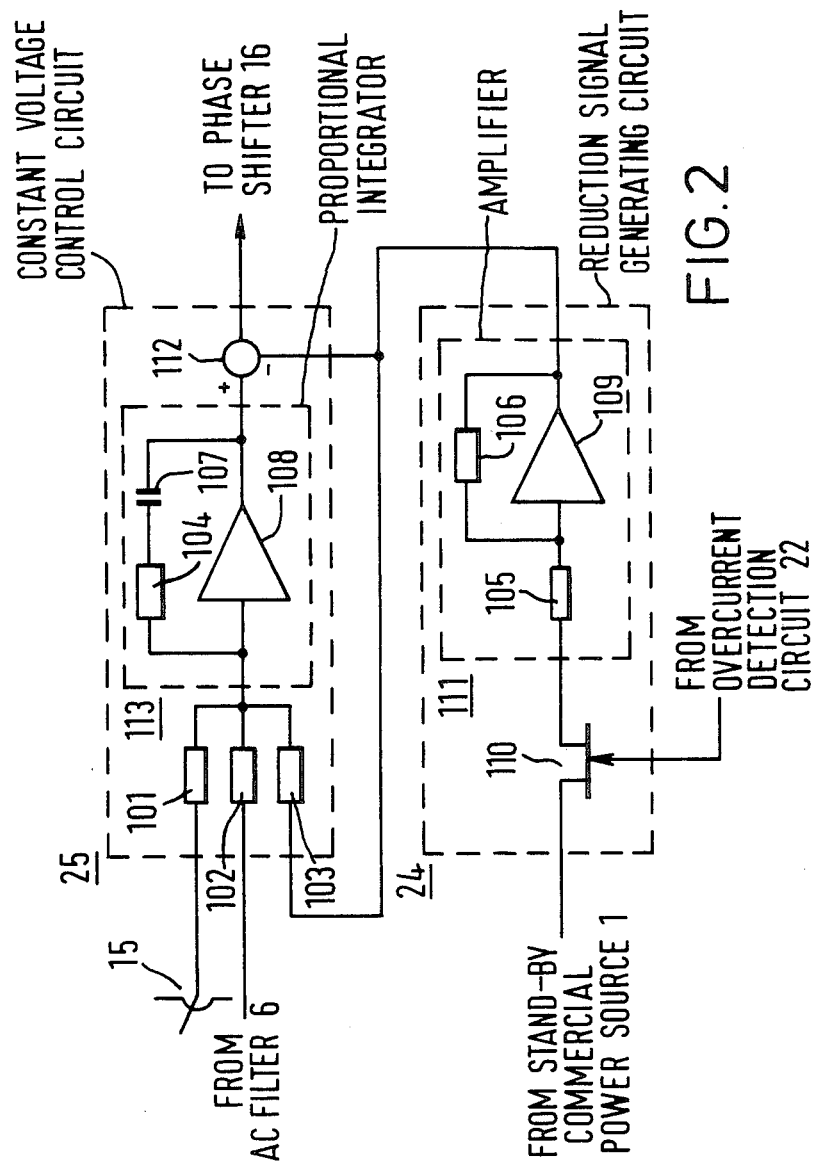
FIG. 2 is a circuit diagram illustrating the reduction signal generating circuit and the constant voltage control circuit of the uninterruptible power supply shown in FIG. 1.

Hereinafter the reduction signal generating circuit 24 and the constant voltage control circuit 25 will be described more in detail with reference to FIG. 2. In FIG. 2, the reduction signal generating circuit 24 includes an analog switch 110, resistors 105 and 106 and an operational amplifier 109. The voltage of the stand-by commercial power source 1 is applied to an input terminal of the analog switch 110. Analog switch 110 normally operates in an OFF state. Its operation changes to an ON state when the overcurrent detection signal is applied from overcurrent detection circuit 22. When analog switch 110 is ON, the voltage of the stand-by commercial power source 1 is applied to an amplifier 111, having a predetermined gain, including resistors 105 and 106 and operational amplifier 109 which reduces the received voltage by the gain of the amplifier 111 to produce the reduced voltage as the reduction signal. The constant voltage control circuit 25 includes resistors 101, 102, 103 and 104, a capacitor 107, an operational amplifier 108 and an analog adder 112. The reference voltage set by voltage reference setting circuit 15 is applied to one terminal of the resistor 101. The output voltage of the inverter 5 is applied to one terminal of resistor 102 through the AC filter 6. The reduction signal from reduction signal generating circuit 24 is applied to one terminal of resistor 103. The other terminals of resistors 101, 102 and 103 are connected together and are also connected to an input terminal of a proportional integrator 113 including resistor 104, capacitor 107 and operational amplifier 108. Analog adder 112 produces the difference between the output signal of proportional integrator 113 and the reduction signal from the reduction signal generating circuit 24, and outputs the difference as the above-described second control signal of the constant voltage control circuit 25.

In the constant voltage control circuit 25 the specified voltage is determined as follows: when the overcurrent detection signal is not outputted from the overcurrent detection circuit 22, the reduction signal is not outputted and the specified voltage is determined to be the reference voltage set by the reference voltage setting circuit 15. When the overcurrent detection signal is received from the overcurrent detection circuit 22, the reduction signal is outputted from the reduction signal generating circuit 24, and the specified voltage is determined to be the reduced voltage based on the reduction signal. Next, the operation of the uninterruptible power supply 100 shown in FIG. 1 will be described in detail. In normal operation, changeover switch 7 is ON while changeover switch 9 is OFF. With these switch states, inverter 5 supplies AC power to load 8. Upon occurrence of a failure of the inverter 5 for any reason, changeover switch 9 is immediately caused to turn ON while, at the same time, changeover switch 7 is caused to turn OFF. With these changed switch states, power from stand-by commercial power source 1 is directly supplied to load 8 without any instantaneous interruption. When it is necessary to shut down inverter 5 for maintenance, switch changeover is made manually so that the power from the stand-by commercial power source 1 is directly supplied to load 8 in the same manner as described above. After recovery from failure of inverter 5, or after completion of its maintenance, changeover switch 7 is again caused to turn ON while at the same time changeover switch 9 is caused to turn OFF whereby output power of the inverter 5 is again supplied to load 8 without any instantaneous interruption.

Figure 3:
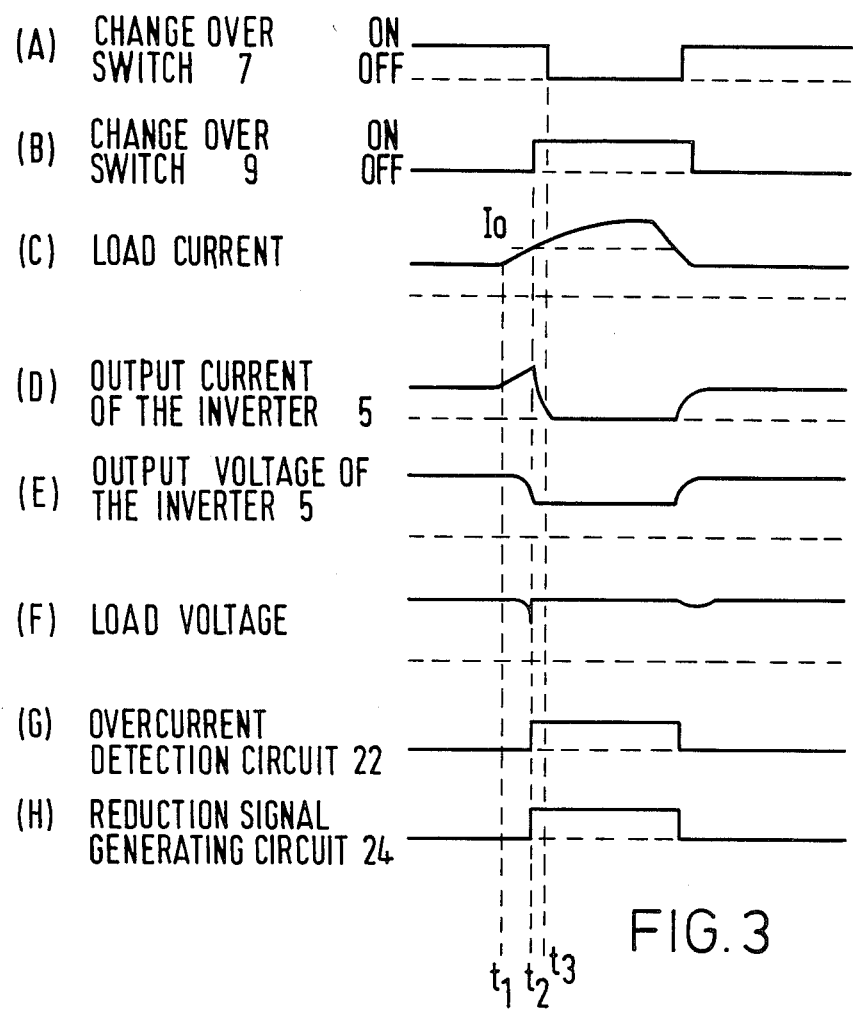
FIG. 3 is a diagram illustrating operation waveforms to explain operations in the respective portions of the uninterruptible power supply shown in FIG. 1.

Next, the case will be described with reference to FIG. 3 when an overload occurs in the uninterruptible power supply 100 shown in FIG. 1. Usually the output of the reduction signal generating circuit 24 remains at zero level during the period when either inverter 5 or the stand-by commercial power source 1 supplies power to load 8 independently. During the period, inverter 5 supplies power to load 8 where the changeover switch 7 is ON while changeover switch 9 is OFF, should a short-circuit failure occur on the load side at a time $t_1$, and a load current increases so rapidly as to exceed the detection level $I_o$ of the overcurrent detection level $I_o$ of the overcurrent detection circuit 22 at a time $t_2$, the overcurrent detection circuit 22 immediately operates so as to supply an overcurrent detection signal to both changeover switch control circuit 23 and the reduction signal generating circuit 24. This causes changeover switch control circuit 23 to supply an ON command to changeover switch 9 and to supply an OFF command to the changeover switch 7. Reduction signal generating circuit 24 supplies the reduction signal to phase shifter 16 through the constant voltage control circuit 25 so as to reduce the output voltage of inverter 5 to the specified voltage in accordance with the magnitude of the voltage of the stand-by commercial power source 1. As described above, changeover switch 9 is caused to turn on while at the same time the reduction signal from the reduction signal generating circuit 24 is supplied to the phase shifter 16, so that the output voltage of the inverter 5 rapidly decreases to the specified voltage. During the period from time $t_2$ to a time $t_3$ when changeover switch 7, preferably of a natural arc-extinction type, is caused to turn OFF within at most one cycle of the output voltage of the inverter and both the changeover switches 7 and 9 are simultaneously ON. During this period inverter 5 and stand-by commercial power source 1 performs a so-called parallel operations. During this time, the shares of AC power sources about a low power factor load are, as well known, determined by the magnitudes of voltages of the respective AC power sources. Here, a power factor in the case of overload, such as in short-circuit condition, is usually a low power factor. Thus, the reduction of the output voltage of the inverter 5 rapidly increases a current to be supplied to load 8 through the stand-by commercial power source 1 and decreases a current supplied to the load 8 through the inverter 5 (refer to FIG. 3(D)).

Figure 4:
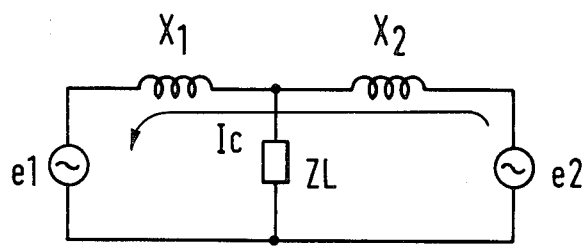
FIG. 4 is a diagram illustrating an equivalent circuit during the transient operations of the uninterruptible power supply shown in FIG. 1.
Figure 5:
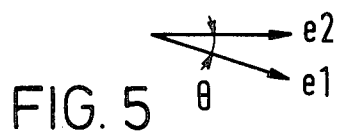
FIG. 5 is a vector diagram to explain the operations of the equivalent circuit shown in FIG. 4.

There will now be further described the arrangement by which the output voltage level of inverter 5 is reduced. FIG. 4 is a diagram illustrating an equivalent circuit during the transient operations of the uninterruptible power supply 100 shown in FIG. 1, and FIG. 5 is a vector diagram to explain the operations of the equivalent circuit shown in FIG. 4. In FIG. 4, $e_1$ designates a voltage of stand-by commercial power source 1 and $e_2$ designates an output voltage of inverter 5. $X_1$ designates an absolute value of an internal impedance of stand-by commercial power source 1 and $X_2$ designates an absolute value of an internal impedance of the inverter 5 as determined by the AC filter 6. $Z_L$ designates an impedance of load 8 in case of an overload. In FIG. 5, $\theta$ designates a phase difference between the voltage $e_1$ and the voltage $e_2$. Ideally voltage $e_1$ is in-phase with the voltage $e_2$, and $\theta$ is zero.

First, assume that the voltages $e_1$ and $e_2$ are equal in magnitude. In this case the voltages $e_1$ and $e_2$ can be represented as $e_1 = E_\epsilon^{j(-\theta)}$, $e_2 = E_\epsilon^{j0°}$ respectively, where the voltage $e_2$ is taken as a reference to the phase. A cross current $I_c$ developed between the stand-by commercial power source 1 and the inverter 5 can be expressed by the following equation, assuming that the load impedance $Z_L$ is excluded.

$$I_c = \frac{E_\epsilon^{j(0°)} - E_\epsilon^{j(-\theta)}}{X_{1\epsilon}^{j90°} + X_{2\epsilon}^{j90°}} = I_c(R) + jI_c(I)$$

Here, the impedance $X_1$ is usually extremely smaller than the impedance $X_2$ ($X_1 << X_2$), so that when the impedance $X_1$ is neglected, the following equations result.

$$I_c(R) = \frac{E}{X_2} \sin \theta$$

$$I_c(I) = -\frac{E}{X_2} (1 - \cos \theta)$$

Where, $I_c(R)$ represents active component of the cross current $I_c$ when observed from the output side of the inverter 5, and $I_c(I)$ is an reactive component of the cross current $I_c$.

Secondly, assuming that the voltage $e_2$ is reduced and is represented as $e_2 = KE \, e^{j0°}$ (K represents a reduction coefficient which is less than 1, $K<1$), the currents $I_c(R)$ and $I_c(I)$ will be expressed as follows:

$$I_c(R) = \frac{E}{X_2} \sin \theta$$

$$I_c(I) = -\frac{E}{X_2} (K - \cos \theta)$$

This means that the variation of the reduction coefficient K causes the reactive component $I_c(I)$ of the cross current $I_c$ to be varied. For example, when $\theta = 2°$ and $X_2$ (expressed in per unit) $= 0.1(p\mu)$, the currents $I_c(R)$ (expressed in per unit) and $I_c(I)$ (expressed in per unit) can be expressed as follows:

$$I_c(R) = \frac{\sin 2°}{0.1} = 0.349 \, (p\mu)$$

$$I_c(I) = \frac{\cos 2° - K}{0.1} = 9.99 - \frac{K}{0.1} \, (p\mu)$$

Assuming that the reduction coefficient $K=0.7$ (corresponds to 30% reduction), the reactive component $I_c(I)$ can be obtained as follows:

$$I_c(I) = 2.99 (p\mu)$$

Namely, a reactive cross current $I_c(I)$ which corresponds to approximately 300% flows from the stand-by commercial power source 1 to the inverter 5 (when observed from the inverter 5, this current is a leading current). When taking the load impedance $Z_L$ into consideration, the amount obtained by subtracting the reactive current flowing into the load 8 from the above-described reactive cross current $I_c(I)$ becomes the reactive cross current flowing into the inverter 5.

When the reduction coefficient K is reduced, the above-described cross current increases. This cross current is a leading current for the inverter 5. Usually inverter 5 is controlled in such a manner as pulse width control or pulse width modulation control, so that it is necessary to perform a forced commutation for the current in inverter 5. If the cross current is excessively large, a commutation failure may occur thereby causing inverter 5 to be tripped. Therefore, the reduction coefficient K is to be determined to an optimum value on the basis of the commutation capability (overload capacity) of the inverter 5, which will be apparent to those skilled in the art taking the above-described concept into consideration.

The gain of amplifier 111 in the reduction signal generating circuit 24 is thus decided to be the reduction coefficient K which is determined as described above.

Stand-by commercial power source 1 has a larger power source capacity than the inverter 5 so that it is usually capable of supplying a considerably larger overcurrent compared with the inverter 5. Thus, stand-by commercial power source 1 can supply current enough to perform selective interruption to the branch circuit in which a short-circuit failure has occurred. The overcurrent supplied from the stand-by commercial power source 1 is capable of causing a selective interruption whereby the overload is released. Thereafter as shown in FIG. 3, overcurrent detection circuit 22 is returned to the original state, resulting that changeover switch 7 is caused to turn ON and change-over switch 9 is caused to turn OFF whereby the uninterruptible power supply 100 returns to the state wherein inverter 5 supplies power to the remaining normal load 8. This restorative operation (from reduced voltage to the reference voltage) may be performed either automatically or manually.

Further, the amount by which the output voltage of inverter 5 is to be reduced can be varied in accordance with the magnitude of stand-by commercial power source 1. So that even when there exist voltage fluctuations in the stand-by commercial power source 1 (a commercial power source usually has voltage fluctuations of approximately 10%), there are performed optimum protective operations such that a cross current is suppressed, to the utmost, so as not to be developed between stand-by commercial power source 1 and inverter 5, and that the overcurrent is rapidly supplied from the stand-by commercial power source 1 instead from the inverter 5.

Next, the case will be described where the uninterruptible power supply 100 supplies power to a load such as a motor or a transformer. At its start-up operation, a start-up rush current flows into the load 8, which exceeds the detection level $I_o$ of the overcurrent detection circuit 22. Then the uninterruptible power supply 100 operates in the same manner as in the short-circuited condition described above. Here, the changeover switch 7 is turned off and changeover switch 9 is turned ON and a start-up rush current is supplied to load 8 from stand-by commercial power source 1. In the start-up operations, no selective interruption is performed and when the start-up rush current decreases and falls below detection level $I_o$ of the overcurrent detection circuit 22, changeover switch 7 is caused to turn ON and changeover switch 9 is caused to turn OFF whereby the uninterruptible power supply 100 will be in the state where inverter 5 supplies power to load 8. This restorative operation is usually performed automatically. As described above, inverter 5 is not tripped during start-up operation, so that such troublesome restarting operation as to start the tripped inverter 5 is not required at every start-up operation.

In the embodiment of FIG. 1, there is described such a case where a commercial power source 1 is used as a reserved power source, however, even in the case where various other power sources are used as reserved power source, similar advantages can be obtained. For example, as a reserved power source an output of a non-utility generator may be employed.

Moreover, the changeover switch 7 of the inverter 5 side does not have to be a semiconductor switch. For example, a mechanical switch such as a contactor may be used so long as it has the slow response characteristics in off operation.

This invention has been described with reference to the presently preferred embodiment of uninterruptible power supply 10. This invention can also be widely applied to a power supply system without a battery which switches an inverter to another reserved power source so as to supply power to a load without any instantaneous interruption.

As described above, this invention can provide a power supply system and a method for controlling thereof which switches an inverter to another reserved power source so as to supply a sufficient overcurrent to a load without any instantaneous interruption and without tripping the inverter when an overload condition occurs.

Numerous modifications, variations, and alternatives of the present invention are possible in light of the above teachings. It is therefore to be understood that within the scope of the appended claims, the invention may be practiced otherwise than as specifically described herein.

What is claimed is:

1. A power supply system, comprising:
   inverter means for converting a DC power into a first AC power;
   reserved power source means for generating a second AC power;
   changeover means, connected to receive said first AC power and said second AC power, for outputting one of said first and second AC power, said changeover means being adapted to supply a current to a load;

overcurrent detection means for detecting said load current, comparing the detected load current with a predetermined detection level to produce an overcurrent detection signal having a first level when said load current is less than said predetermined detection level and a second level when said load current is equal to or greater than said predetermined detection level;

means for controlling a frequency and phase of said first AC power to coincide with a frequency and phase, respectively, of said second AC power and controlling a voltage of said first AC power to be a specified voltage, said specified voltage being determined to be a predetermined reference voltage when said overcurrent detection signal is at said first level and to be a reduced voltage that is between zero voltage and a voltage of said second AC power when said overcurrent detection signal is at said second level;

said changeover means being further connected to receive said overcurrent detection signal, and for outputting said first AC power when said overcurrent detection signal is at said first level and outputting said second AC power when said overcurrent detection signal is at said second level.

2. A power supply system according to claim 1 wherein said controlling means comprises:

phase and frequency control means, connected to said first and second AC powers, for providing a first control signal which includes information to control the frequency and phase of said first AC power;

voltage control means, connected to receive said reference voltage, said first and second AC power and said overcurrent detection signal, for providing a second control signal which includes information to control the voltage of said first AC power to said specified voltage; and control means for controlling, responsive to said first and second control signals, said frequency and phase of said first AC power to coincide with said frequency and phase of said second AC power, respectively and for controlling the voltage of said first AC power to be said specified voltage.

3. A power supply system according to claim 2, wherein said voltage control means includes:

reduction signal generating means, connected to receive said second AC power and said overcurrent detection signal, for producing said reduced voltage as a reduction signal when said overcurrent detection signal is at said second level; and constant voltage control means connected to receive said predetermined reference voltage, said first AC power and said reduction signal, for producing said second control signal.

4. A power supply system according to claim 3, wherein:

said reduction signal generating means produces a product of a voltage of said second AC power and a reduction coefficient and generates said product as said reduction signal, said reduction coefficient being between 0 and 1.

5. A power supply system according to claim 2, wherein said overcurrent detection means includes:

current transformer means connected to detect said load current; and overcurrent detection circuit means, connected to receive said detected load current, for comparing said detected load current with said predetermined detection level to produce said overcurrent detection signal.

6. A power supply system according to claim 2, wherein said phase and frequency control means includes phase locked loop circuit means including:

phase difference detector means, connected to receive said first AC power and said second AC power, for producing a phase difference between said first and second AC power;

low pass filter means, connected to receive said phase difference, for deriving low-frequency components from said phase difference; and voltage controlled oscillator means, connected to receive an output of said low pass filter means, for generating pulses having a frequency which is determined in response to said output of said low pass filter means, and for outputting said pulses as said first control signal.

7. The power supply system according to claim 2, further comprising:

rectifier means for converting an AC power into said DC power;

wherein said inverter means further includes inverter circuit means, connected to receive said DC power, for converting said DC power into a square wave output, and AC filter means for filtering said square wave output into a sinusoidal wave output and for outputting said sinusoidal wave output as said first AC power.

8. The power supply system according to claim 2, further comprising:

rectifier means for converting an AC power into said DC power; and battery means for generating a second DC power;

wherein said inverter means receives at least one of said DC power and said second DC power as an input DC power.

9. The power supply system according to claim 2 wherein:

said changeover means includes semiconductor switches.

10. The power supply system according to claim 2, wherein:

said changeover means includes mechanical switches.

11. An uninterruptable power supply, comprising:

rectifier means for converting an input AC power into a first DC power;

battery means for providing a second DC power;

inverter means connected to receive at least one of said first DC power and said second DC power as a DC input power, for converting said DC input power into a square wave output;

AC filter means for shaping said square wave output into a sinusoidal wave output to produce a first AC power;

reserved power source means for generating a second AC power;

changeover switch means connected to receive said first AC power and said second AC power for outputting one of said first and second AC power, said changeover switch means being adapted to supply a load current to a load;

phase locked loop means connected to receive said first AC power and said second AC power, for producing pulses to control a phase and a frequency of said first AC power to coincide with a phase and a frequency of said second AC power and for outputting said pulses as a first control signal;

current detector means for detecting said load current;

overcurrent detection means, connected to detect said load current, for generating an overcurrent detection signal when said load current is equal to or more than a predetermined detection level;

reduction signal generating means, connected to receive said second AC power and said overcurrent detection signal, for producing a product of a voltage of said second AC power and a reduction coefficient as a reduced voltage when said overcurrent detection signal is received and for generating said reduced voltage as a reduction signal;

constant voltage control means connected to receive a predetermined reference voltage, said first AC power and said reduction signal, for producing a second control signal to control a voltage of said first AC power to be a specified voltage, said specified voltage being determined to be said predetermined reference voltage when said overcurrent detection signal is not received and to be said reduced voltage when said overcurrent detection signal is received;

phase shifter means connected to receive said first control signal and said second control signal for controlling the phase, the frequency and the voltage of said first AC power to coincide with the phase and the frequency of said second AC power, and with said specified voltage determined by said second control signal, respectively; and changeover switch control means, connected to receive said overcurrent detection signal, for controlling said changeover switch means such that said first AC power is outputted when said overcurrent detection signal is not received and said second AC power is outputted when said overcurrent detection signal is received.

12. A method for controlling a power supply system, including, inverter means for converting a DC power into a first AC power, reserved power source means for generating a second AC power, changeover means connected to receive said first AC power and said second AC power for outputting one of said first and second AC power, said changeover means being adapted to supply a load current to a load, and control circuit means connected to receive said first AC power, said second AC power and a reference voltage for controlling said first AC power such that a phase, a frequency and a voltage of said first AC power coincide with a phase and a frequency of said second AC power, and said reference voltage, respectively, said method comprising the steps of:

detecting whether or not said load current exceeds a predetermined detection level; and supplying said load current from said reserved power source means and stopping supplying said load current from said inverter means by controlling said changeover means and reducing the voltage of said first AC power to a specified reduced voltage when said load current exceeds said predetermined detection level.

13. The method according to claim 12, further comprising the steps of:

detecting whether or not said load current exceeds said predetermined detection level after said load current has exceeded said predetermined detection level; and supplying said load current from said inverter means and stopping supplying said load current from said reserved power source means by controlling said changeover means and increasing the voltage of said first AC power to said reference voltage in case that said load current is below said predetermined detection level.

14. The method according to claim 12, wherein said specified reduced voltage is determined according to the voltage of said second AC power.

15. A method according to claim 12 further comprising the steps of:

when current is being supplied to the load by the second AC power, detecting whether the magnitude of current exceeds a threshold level, in the event that the threshold level is exceeded, again supplying current to said load from said first AC power, stopping supplying current to said load from said second AC power and increasing the voltage of said first AC power to said reference voltage.

16. A method according to claim 13 wherein the level of said specified reduced voltage of the first AC power is a function of a voltage of the second AC power.

17. A method according to claim 15 wherein the level of said specified reduced voltage of the first AC power is a function of a voltage of the second AC power.

* * * * *